United States Patent [19]

Eckmann

[11] Patent Number: 4,925,270

[45] Date of Patent: May 15, 1990

[54] APPARATUS FOR ASSISTING VIEWING OF STEREOSCOPIC DISPLAYS

[76] Inventor: Rolfe Eckmann, 630 5th Ave., Ste. 204, Edmonds, Wash. 98020

[21] Appl. No.: 196,442

[22] Filed: May 20, 1988

[51] Int. Cl.$^5$ ......................... G02B 27/22; G02B 7/18
[52] U.S. Cl. .................................... 350/131; 350/133; 350/143; 351/57; 351/201
[58] Field of Search ............... 350/130, 131, 133, 138, 350/139, 142, 143, 146, 145, 286; 351/57, 58, 201

[56] References Cited

U.S. PATENT DOCUMENTS

| 2,267,952 | 12/1941 | Sauer | 350/130 |
| 2,759,395 | 8/1956 | Wofford | 350/146 |
| 2,766,656 | 10/1956 | Better | 350/146 |
| 3,741,634 | 6/1973 | Stoltze | 351/57 |

FOREIGN PATENT DOCUMENTS

| 339092 | 10/1904 | France | 350/133 |
| 1191210 | 10/1959 | France | 350/130 |
| 37977 | 12/1954 | Poland | 350/130 |
| 290355 | 4/1953 | Switzerland | 350/133 |

OTHER PUBLICATIONS

W. L. Berssenbrugge, "Framing...,Part I", *American Photo.*, May 1948, pp. 276-279.
W. L. Berssenbrugge, "Framing...,Part II", *American Photo.*, May 1948, pp. 350-354.

*Primary Examiner*—Jon W. Henry
*Attorney, Agent, or Firm*—Russell W. Illich

[57] ABSTRACT

A stereoscopic viewing device to induce the line of sight of a viewer's eyes to converge on a three dimensional image formed from a pair of stereoscopic images. The device includes a pair of prisms and blinders to block out ghost images which form to the sides of the superimposed image. The device further includes adjustment means to narrow or widen the viewing window which the prisms form. One embodiment of the adjustment means includes blinders that are slidable panels within a guide track while another embodiment of the adjustment means are separate prisms slidable within a guide track.

7 Claims, 7 Drawing Sheets

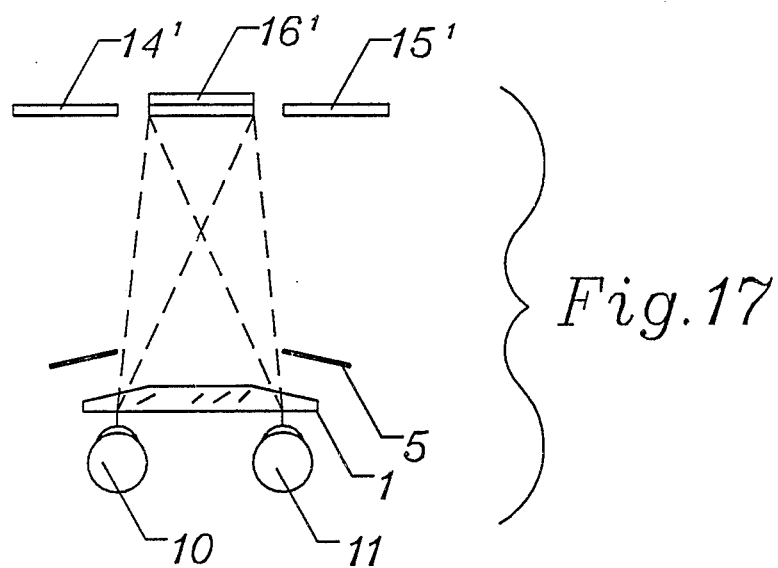

APPARATUS FOR ASSISTING VIEWING OF STEREOSCOPIC DISPLAYS

BACKGROUND OF THE INVENTION

Free-viewing of stereoscopic displays such as photographs is an enjoyable experience. A person with satisfactory vision from both eyes stands several feet away from two stereoscopic images such as photographs, a left and right. The person, trained in free-viewing sets his/her left eye to focus onto the right photograph (which is indeed the left image) while setting their right eye to focus onto the left photograph (which is actually the right image). When properly done, the person sees three images. The middle image appearing to have depth, or a third dimension. Stereoscopic photographs are photographs taken of the same image with small spatial and angular displacement alike images seen from a left eye and a right eye.

For free-viewing to happen muscles of the eyes have been trained to shift the line of sight from the object of their vision, the left eye to cross over the center towards the right and the right eye to cross over the center towards the left. Free-viewing superimposes the right image from the left eye onto the left image from the right eye and in focus. The mind seeing two photographs identical except for small spatial and angular displacements superimposed upon themselves, interprets the center image as one having the depth of an object with three dimensions. Once the free-viewing of the image has occurred, the mind controlling the muscles of the eyes maintains the three dimensional position of the image.

Free-viewing is a memorable experience albeit difficult to achieve since the eyes must be kept at a convergence greater than that dictated by the normal focus. To attain this convergence the focus must be kept on a point beyond the convergent point. This focus is impossible to achieve for some people and produces discomfort in others. The voluntary muscles are not sufficiently developed to overcome the natural impulse to focus onto separate objects or to operate outside their normal range.

Stereoscopic viewers are old and well known in the prior art of optics. Many of the basic concepts of stereoscopic viewing were derived in the late 1800's and early 1900's. However, this area of optics has been largely ignored in recent times.

New developments in this area have mainly been confined to the projection of stereoscopic images or the actual photography or development of superimposed images using modified stationary and motion cameras. the U.S. Pat. No. 3,891,303 to Barquero shows an adaptor to be used with cameras to produce stereoscopic image. Barquero shows a very effective way of producing a central superimposed image by using prisms before the viewing lenses and using screens in front of the prisms to block out secondary image. the U.S. Pat. No. 3,039,358 to Vierling uses Barquero's concept and incorporates the prisms and screens integrally within a camera.

The re-emergence of 3-dimensional projection has been given much attention in recent years and has not been confined to still photography. The development of this technology for motion pictures, television, and computer images has been growing at a rapid pace. However, stereoscopic viewers have remained largely undeveloped and no significant improvements have been made in viewing devices in many years.

The device disclosed in the U.S. Pat. No. 262,846 to Stevens was a standard type of stereoscopic viewing device used well into the 1900's. This device has some severe limitations. The device requires a specific size photograph, three or four major adjustments were needed to view the 3-dimensional image, and two sets of image blocking screens were needed to block undesired images. the U.S. Pat. No. 3,502,390 to Gilmore shows a much simpler device to view 3-dimensional images of x-rays. However, outer walls and a central partition are needed to force the eyes to see the superimposed image. These walls force the pictures or x-rays to be placed at a predetermined distance and remain a standard size.

One viewing device that went a long way to correcting the deficiencies of the above noted devices is the device disclosed in the U.S. Pat. No. 1,440,457 to Girsdansky. This device divorces the viewing lenses from the viewing screen(s). This was a significant breakthrough in 3-D viewing. By arranging the prisms in a manner similar to the projectors of Barquero and Vierling, Girsdansky's viewing device enables a viewer to induce free-viewing and see superimposed images of any size and at great distances for applications in auditoriums, museums and theaters.

But Girsdansky's device has several disadvantages which have remained unimproved on for more than sixty years. First, the blocking screens require both a longitudinal and a lateral adjustment for the viewer to focus properly on the superimposed image. Second, the blocking screens move laterally together and apart at concurrent distances. This does not allow for complete focusing adjustment for all types of persons who may need one blocking screen moved further in than the opposite blocking screen. Third, the openings within the viewer limit the width of the pictures being viewed; thus, to view wide motion picture screens on would have to sit well back in the theater to see the entire screen. Finally, the holder of Girsdansky's device is generally bulky and would be expensive to manufacture requiring many different parts.

SUMMARY OF THE INVENTION

With the advancements being made in the graphics of stereo images in all their applications, there is a pressing need in the art to develop a stereoscopic viewing device that allows a viewer the maximum in flexibility in viewing a variety of stereo images in a variety of environments with the greatest efficiency.

The present invention solves the problems inherent in the prior art viewing devices, and does allow for a wide variety of viewing situations through a very efficient, yet simple viewing mechanism. The present invention uses a simple double prism with a pair of blinders or blocking screens situated in close proximity to the viewing prisms.

One object of the present invention is to provide a stereoscopic viewing device that allows a viewer the freedom to see peripherally and not restrict the viewer's sight down a tunnel-type viewing device.

Another object of the present invention is to provide a stereoscopic viewing device that allows independent focusing of the eyes to accommodate all types of people with different ocular dimensions.

Another object of the present invention is to provide a stereoscopic viewing device that allows a viewer to see the superimposed image with a single focusing motion.

Another object of the present invention is to provide a stereoscopic viewing device that may be used on all focusing planes.

Yet another object of the present invention is to provide a stereoscopic viewing device that is light, compact and inexpensive to manufacture.

Still further objectives of the invention will become apparent upon a full reading of the detailed description of the invention, as follows.

BRIEF DESCRIPTION OF THE DRAWINGS

FIGS. 14–17 shows a series of top plan views describing the process of free viewing with and without a pair of prisms.

DETAILED DESCRIPTION OF THE INVENTION

Figure 1:
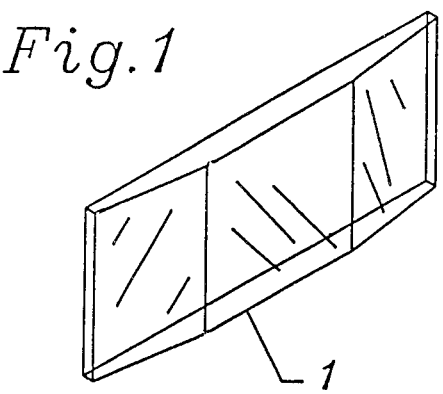
FIG. 1 shows a perspective view of the prisms used in the stereoscopic viewing device.
Figure 2:
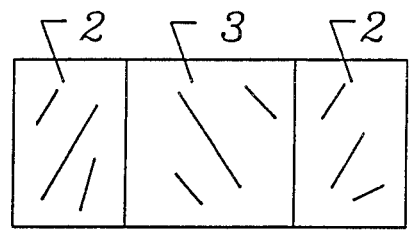
FIG. 2 shows a front plan view of the prisms of FIG. 1.
Figure 3:
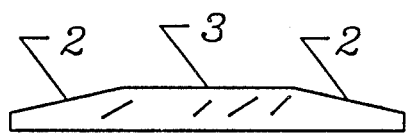
FIG. 3 shows a top view of the prisms of FIG. 1.

The main aspect of the present invention involves using prisms to permit the eyes to remain in their normal line of signt for a given focal point be it close up or distant. FIGS. 1–3 show one type of arrangement for these type of prisms. In this case a left and a right prism are formed into one integral unit 1. Left and right prisms are formd by the sloping faces 2 while center face 3 is used to interconnect the two prisms. It should be noted that the center face is not used in the viewing process other than to hold the prisms together and therefore could be clear, opaque, or made of an entirely different material. The prisms can be made of glass or any transparent plastic.

Figure 4:
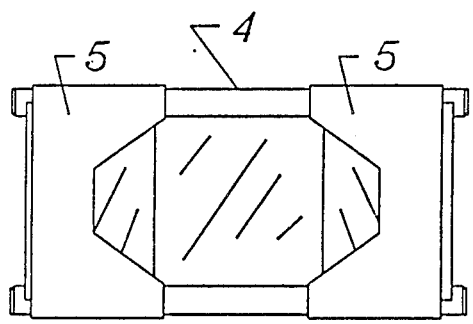
FIG. 4 shows a front plan view of a first embodiment of the invention.
Figure 5:
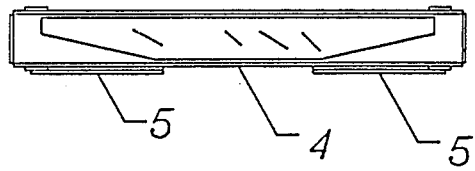
FIG. 5 shows a top view of the viewing device of FIG. 4.

FIGS. 4 and 5 show a first embodiment of the viewing device which uses the prism arrangement shown in FIGS. 1–3. The device includes a housing 4 for holding the prisms in a single position. Mounted on the housing 4 are a pair of blinders 5. These blinders slide along the top and bottom rails of the housing such that they can be slid toward and away from each other as viewed in FIG. 4. The purpose of the blinders is to cover a portion of the prisms for reasons that will be described later.

A person using the device for stereo viewing can look out of the device from the front or rear planes as viewed in FIG. 4. This is because a prism always reflects a light ray outwardly at the same angle. Hence, it would not matter whether the person using the device has the angled faces 2 of FIG. 3 facing their eyes or away from their eyes as the light rays coming through the prism will always be deflected at the same angle. These angles will be discussed in much more detail, below.

Figure 6:
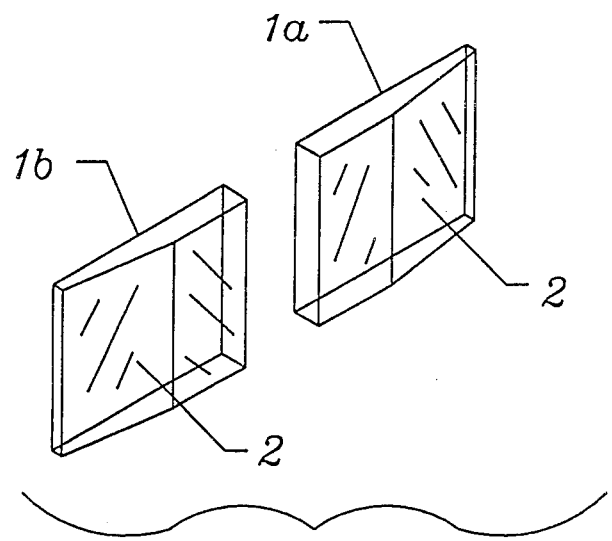
FIGS. 6 and 7 show a perspective views of an alternative prism arrangement.
Figure 7:
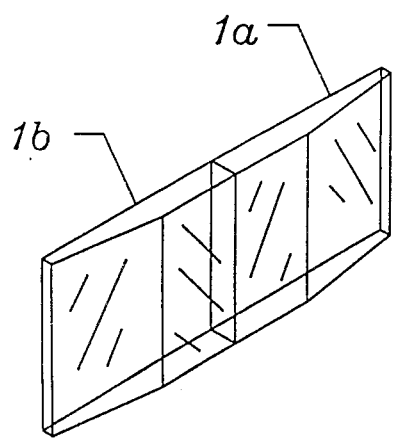

FIGS. 6 and 7 show a second alternative prism arrangement. In this case, the left and right prisms are split into first and second pieces 1a and 1b. The angled faces 2 are still present on these prisms and act in the same manner as described for the prisms of FIGS. 1–3.

Figure 8:
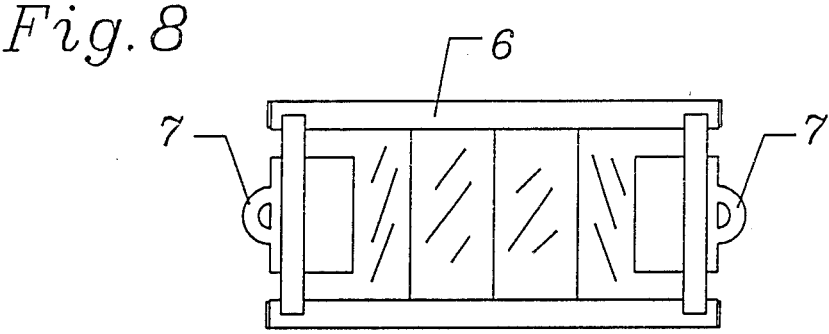
FIGS. 8 and 9 show front plan views of a second embodiment of he invention using the prism arrangement shown in FIGS. 6 and 7.
Figure 9:
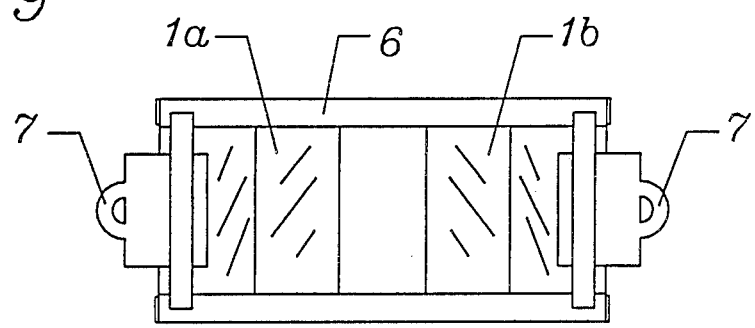
Figure 10:
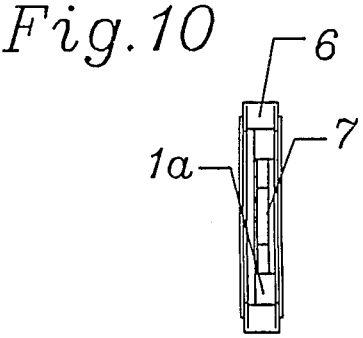
FIG. 10 shows a side view of the viewing device shown in FIGS. 8 and 9.

FIGS. 8–10 show a viewing device which use the prismsof FIGS. 6 and 7. First and second pieces 1a and 1b are slidably mounted within housing 6 which uses upper and lower tracks to guide the prism pieces as best shown in the side view of FIG. 10. The prism pieces 1a and 1balso include handles 7 which are attached to the prisms and are used to slide the pieces back and forth within their tracks. Handles 7 are also used as blinders on the angled faces 2 of the prism pieces 1a and 1b. In this case, the blinders slide as one with the prism pieces, and provide the desired interruption of the line of sight.

The viewing device of FIGS. 8–10 has the advantage of being adjustable to persons with all types of ocular dimensions. Specifically, a person with eyes set wide apart or close together need not rely on a pair of prisms rigidly mounted within a frame. This device allows the prims to be slid towards or away from each other to accommodate different interpupilary distances.

Figure 11:
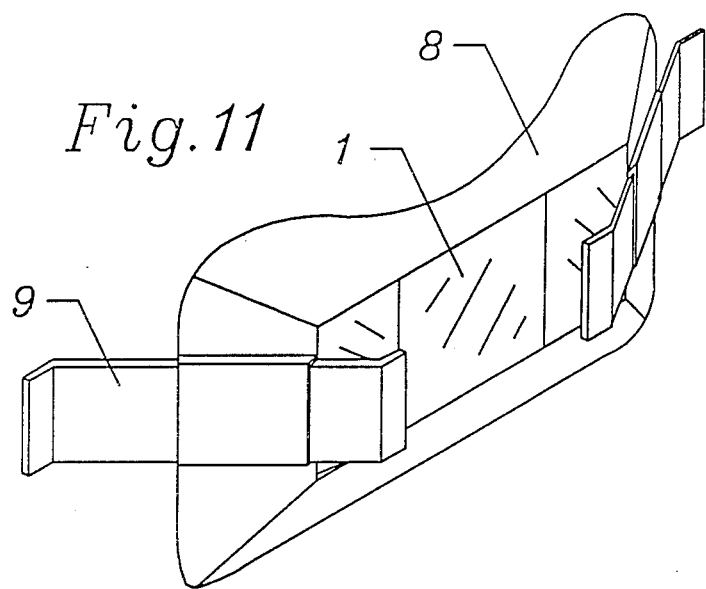
FIG. 11 shows a perspective view of a third embodiment of the viewing device.

FIG. 11 shows a perspective view of a third embodiment of the viewing device. In this embodiment the housing 8 is formed as a plastic shield which positions the device around a viewer's eyes. The prisms 1 are rigidly mounted within this housing. Slidably mounted blinders 9 are mounted within the housing 8 and may be moved outwardly or inwardly to cover a portion of the prisms in the viewing process.

Figure 12:
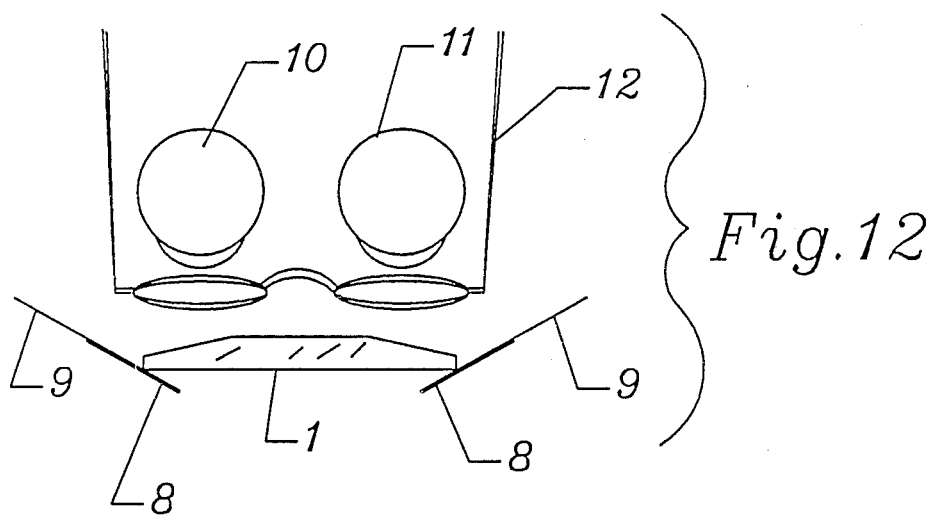
FIG. 12 shows a top plan view of the viewing deive of FIG. 11, with portions of the device broken away for clarity, used in conjunction with a pair of glasses.

The major advantage of the viewing device of FIG. 11 is best shown in FIG. 12 where it is used in conjunction with a person that requires prescription eyeglasses 12. In this case, a person's eyes 10 and 11 which require glasses 12 may place the viewing device over the outside of the eyeglasses such that the housing 9 forms a shield while the eyes may easily see through the prisms 1 which are positioned in fron of the eyeglasses.

Figure 13:
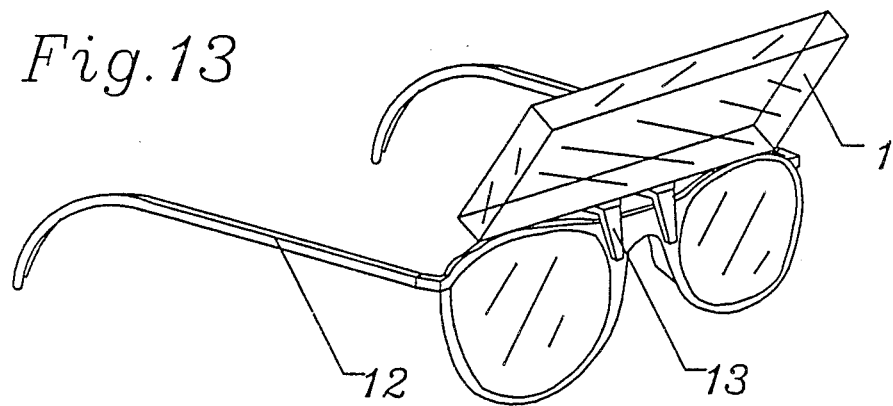
FIG. 13 shows a perspective view of a fourth embodiment of the invention used in conjunction with a pair of glasses.

FIG. 13 shows a fourth embodiment which is also used in conjunction with a pair of prescription eyeglasses 12. In this case the prisms include a pair of bifurcated clips 13 which may be fitted onto the bridge of glasses 12. Thus the prisms may be flipped upwardly, as shown, when not in use or be flipped downwardly when used in three dimensional viewing much like clip-on sunglasses. It should be noted that the binders are not shown here for clarity rasons but would also be present on the outside of the prisms 1 mounted in much the same way as shown in FIGS. 4 and 5.

Figure 14:
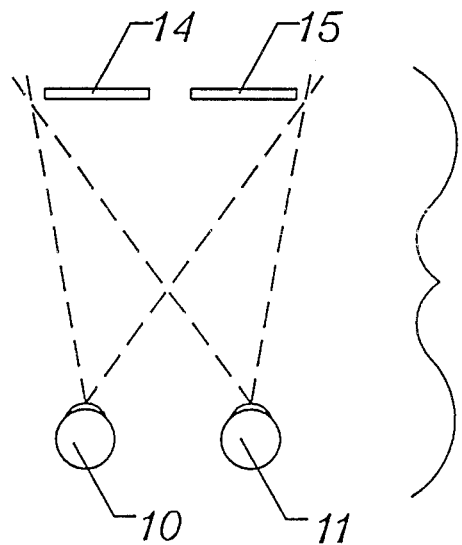

FIGS. 14–17 show the process of free and stereo viewing in which the viewer's eyes must achieve to view two images as a superimposed three dimensional image. FIG. 14 begins by showing a viewer's eyes 10 and 11 looking at a pair of stereo images 14 and 15. In this case the viewer sees the images 14 and 15 as separate photos in two dimensions as shown by the dashed viewing lines.

Figure 15:
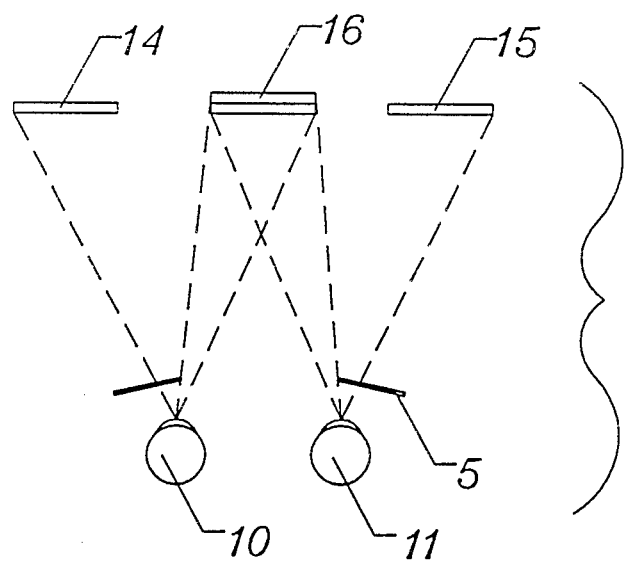

Free viewing can occur without a prism as shown in FIG. 15. In this case the viewer must force his/her eyes to converge in order to see the superimposed image 16 formed by the two dimensional images 14 and 15. Blinders 5 assist the viewer by blocking out light rays which would otherwise make images 14 and 15 viewable. Hence, eyes 10 and 11 only see the superimposed three dimensional image 16. The drawback of viewing superimposed images in this manner is getting the eye muscles to adjust to such convergence in conflict with the eyes' normal focus as dictated by that convergence. Once achieved it is rather difficult to maintain and will often lead to physical discomfort from eye muscle strain.

Figure 16:
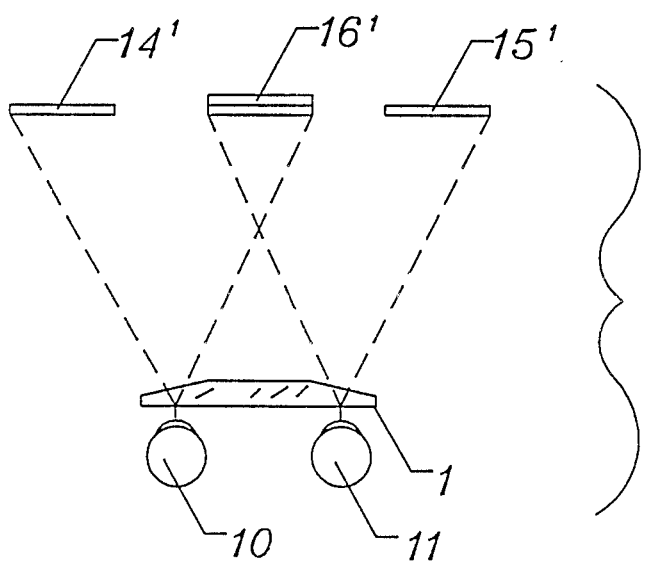

FIG. 16 shows the same view as FIG. 14 where the eyes 10 and 11 do achieve stereo viewing with the aid of the prisms 1. In this case, the prism deflects the light rays in such a manner to void significant strain on the eye muscles. Additionally, achieving the three dimensional viewing initially is much easier with the aid of the prism in deflecting light rays. The drawback to this arrangement however, is that when the superimposed image 16' comes into view, two additional "ghost" images 14' and 15' also come into view. This can cause confusion to an inexperienced viewer so that they may refocus onto one of the ghost images and lose the superimposed image. Thus, althoughthe prism helps the viewer initially achieve the stereo viewing experience, the ghost images make it difficult to maintain the experience.

To resolve this deficiency, blinders are used in conjunction with the prism as shown in FIG. 17. Blinders 5 are shown blocking out the undesirable light rays which form the ghost images. In fact, in this case the blinders are so close to the eyes that the light rays which would ordinarily form the ghost images never develop. This is a key component of the improvement of this invention over previous three dimensional viewing devices. These devices as described in the background, above, use blocking screens or blinders which are set a significant distance from the prisms. The disadvantage of this is threefold. One, the ghost images actually develop so that adjustment of the screens is critical. Two, the distant screens must be carried by bulky holders which block out any possible peripheral vision and therefore restrict the size of the viewed graphic. And three, since the blinders are at a distance from the prism the person using the device has a harder time achieving stereo viewing since the screens themselves can become an object of focus preventing or delaying the superimposed image from coming into view. The present invention resolves these drawbacks by keeping the screens or blinders close to the prism so that the ghost images never form and the screens are so close that they cannot be a distraction when focusing on the superimposed image. Additionally, by having the screens close to the prism, the entire device can be housed in a housing that is much less bulky and open to a number of different lightweight holders which can be used in a wide variety of applications.

The embodiment of FIGS. 8-10 has the further advantage of being totally adjustable for all types of individuals. Minor convergence corrections are achieved naturally and comfortably. This need in the prior art has remained unfilled by all of the previous three dimensional viewing devices.

It can be seen by the foregoing description that the present invention discloses a stereoscopic viewing device that is a big improvement over previous viewing devices. There are many different modifications which could be applied to the viewing device that are encompassed by the spirit of the present invention. For example, separate prisms could be mounted rigidly into a housing using movable blinders. The present invention is submitted not to be limited by the foregoing specification, but is defined by the claims appended hereafter.

What is claimed is:

1. An apparatus for assisting viewing of stereoscopic displays comprising,
   first and second prisms, said prisms including a first face and a second face, said second face lying in a plane that forms an acute angle with said first face,
   mounting means for said first and second prisms, said mounting means including a window formed by an open space within said mounting means,
   blinder means for covering a portion of said prisms and said window, said blinder means positioned in close proximity to said first and second prisms,
   adjustment means for varying the width of said window,
   wherein, said apparatus may be placed before a pair of human's eyes and said prisms induce a three dimensional central image when viewing superimposed images and wherein said adjustment means in combination with said blinder means allows the prisms to be adjusted to different ocular dimensions of different persons.

2. An apparatus as claimed in claim 1, wherein,
   wherein said first and second prisms are integrally joined together by a central portion to form a signal unit,
   said prism unit rigidly mounted within said mounting means,
   said blinder means comprising a pair of panels for covering a portion of said first and second prisms,
   said adjustment means comprising guide means for said panels to allow the panels to be moved reciprocally within the guide means.

3. An apparatus as claimed in claim 2, wherein,
   said mounting means comprises a frame, said frame comprising an opening into which said prisms are mounted, said frame further comprising four walls extending outwardly rom said first and second prisms, said walls flared outwardly from said firsst face of said prisms at an angle less than 180 degrees.

4. An apparatus as claimed in claim 3, wherein,
   said movable panel are slidably mounted within a pair of apertures within two of said four walls.

5. An apparatus as claimed in claim 1, wherein,
   said first and second prisms are separate units,
   said adjustment means comprising a guide means for said first and second prisms to allow the prisms to slide independently within said guide means,
   said blinder means comprise a pair of opaque members rigidly attached to a portion of said first and second prisms.

6. An appartus as claimed in claim 5, wherein,
   said adjustment means further comprises handles extending outwardly from said pair of opaque members,
   wherein the handles are grasped and pulled or pushed within the guide means to adjust the prisms along the guide means.

7. An apparatus as claimed in claim 1, wherein,
   said viewing device comprises bifurcated clips which may be attached to the rims of a pair of glasses wherein a viewer wearing such glasses may move the prisms in front of and out of the way of the glasses.

* * * * *